S. G. JACOBS.
CONSTRUCTION OF THE BODIES OF MOTOR ROAD VEHICLES.
APPLICATION FILED JAN. 22, 1917.

1,264,804.

Patented Apr. 30, 1918.

Witnesses:
M. E. McDade
C. D. Kesler

Inventor:—
Sydney G. Jacobs
by James L. Norris
Attorney

S. G. JACOBS.
CONSTRUCTION OF THE BODIES OF MOTOR ROAD VEHICLES.
APPLICATION FILED JAN. 22, 1917.

1,264,804.

Patented Apr. 30, 1918.

Inventor:—
Sydney G. Jacobs

UNITED STATES PATENT OFFICE.

SYDNEY GORDON JACOBS, OF MOSELEY, BIRMINGHAM, ENGLAND.

CONSTRUCTION OF THE BODIES OF MOTOR ROAD-VEHICLES.

1,264,804.  Specification of Letters Patent.  Patented Apr. 30, 1918.

Application filed January 22, 1917. Serial No. 143,817.

*To all whom it may concern:*

Be it known that I, SYDNEY GORDON JACOBS, a subject of the King of Great Britain, residing at No. 16 Park road, Moseley, Birmingham, England, have invented certain new and useful Improvements in the Construction of the Bodies of Motor Road-Vehicles, of which the following is a specification.

This invention has reference to bodies for motor cars, and more particularly to that form or style of body in which the upper part thereof has a shape somewhat resembling a semi-cylindrical tube, the axis of which crosses the chassis transversely; the invention comprising certain improvements, hereinafter fully described, in or relating to the construction of the aforesaid bodies, whereby a new and highly artistic design is obtained and the conversion of the car from open to closed type, and vice versa, is facilitated.

The invention will be specifically described in connection with the accompanying drawings, which are more or less diagrammatic, Figure 1 being a perspective view of the car body and Figs. 2 and 3 representing, in side elevation and plan, respectively, the improved car body mounted on a chassis, the mechanism usually seen below the chassis frame being omitted.

In the said Figs. 2 and 3, the adjustable or sliding parts of the upper quadrant or sector of the car body are represented in their closed positions, and indicated in dotted lines in Fig. 2 in a partially open position.

The same letters of reference indicate the same parts in the several figures of the drawings.

A is the semi-cylindrical upper half or part of the car body, the said upper part or half consisting or being built up of a series of transparent framed panels marked $a$, $a$, $a$ in the front quadrant-like part or sector and $a^1$, $a^1$, $a^1$ in the rear quadrant-like part or sector of the semi-cylindrical upper part of the body.

Figure 1:
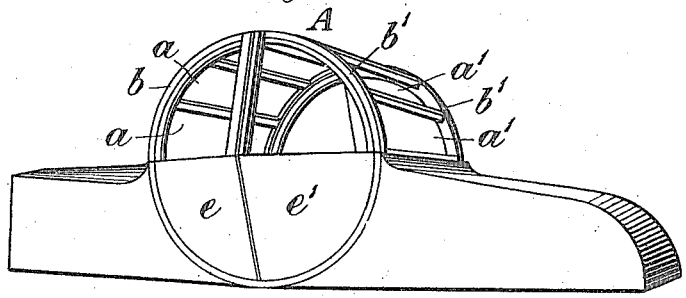
Figure 2:
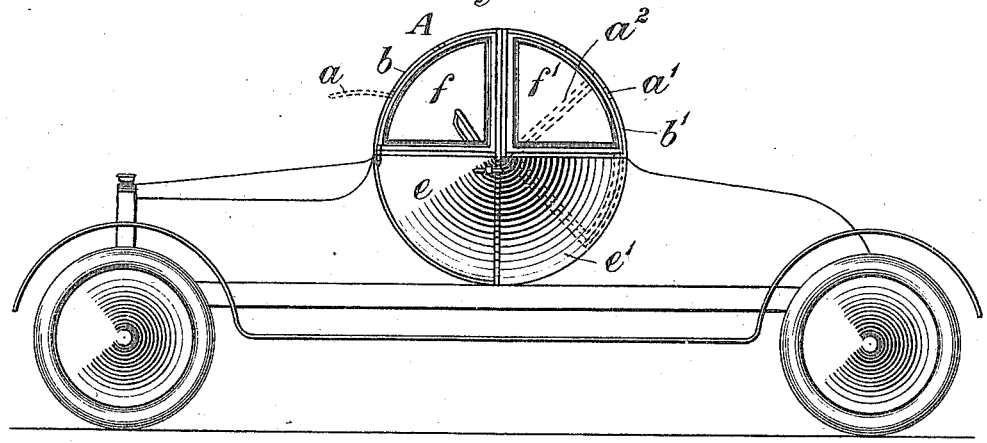

One or more of the framed panels $a$ of the front quadrant or sector of the upper part A of the car body is or may be so hinged to the side frames $b$ of the quadrant as to be capable of being turned outward (or inward) as indicated in dotted lines in Fig. 2, after the manner of an ordinary wind screen; or one or more of the said panels $a$ may be made capable of sliding over the adjacent panel or panels for the purpose of obtaining an open or partially open front at the upper part A of the car.

Figure 4:
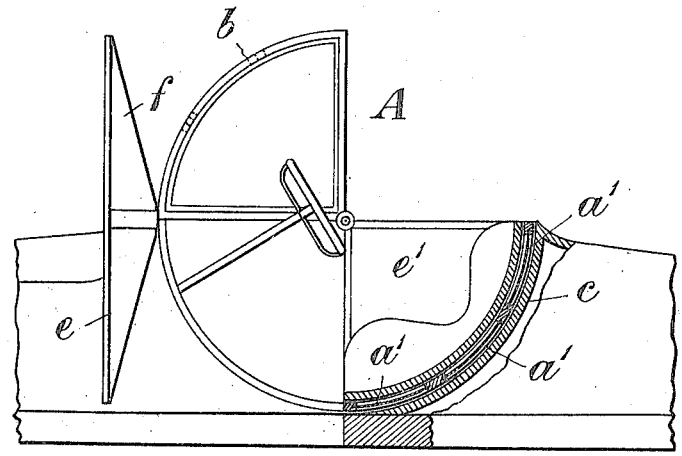
Fig. 4 represents in side elevation, partly in longitudinal section, the car body with one of the halves of one side or end of the tubular body open for gaining admission to the car, and with the upper rear quadrant or sector of the tubular body turned into the recess provided for its reception behind and below the seat of the vehicle for the purpose of obtaining an open car.

The rear quadrant of the semi-cylindrical upper part A is provided at each side with radial arms $a^2$, $a^2$ which permit the quadrant to be mounted on horizontal pivots on which it may be partially or completely turned into the space or compartment $c$, provided for its reception behind or below the seat of the vehicle, as is seen in Fig. 4, when it is desired to use the car as an open vehicle; and the side pieces or supporting frames $b^1$ of the said rear quadrant may be made detachable so that they may be removed and replaced when desired, the said side frames $b^1$ being removed in Fig. 4.

Figure 3:
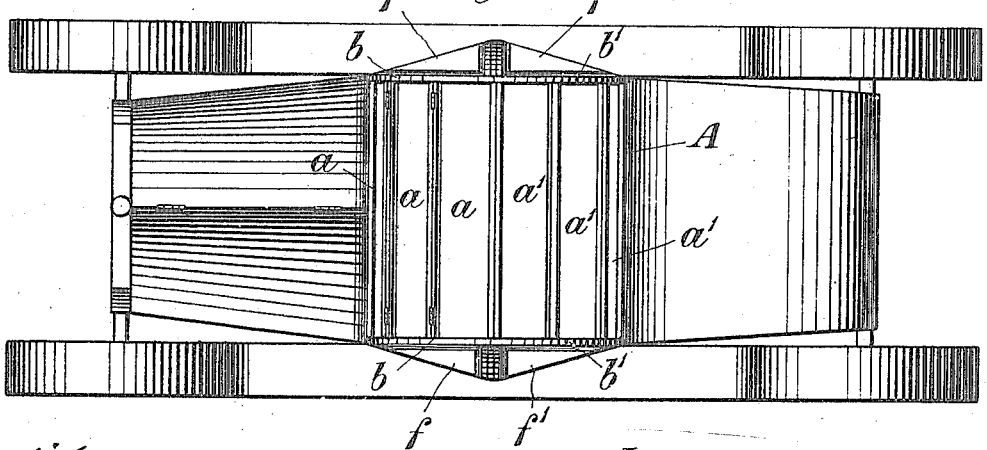

$e$, $e^1$ are the end closing parts or halves of the tubular body, the said parts or halves meeting or overlapping preferably in the vertical plane containing the axis of the said body, and where the said tubular body is cylindrical each closing end is preferably shaped in the form of a cone having a very short axis, the apex of the cone being directed outward, as is best seen in Fig. 3.

One half of each of the closing ends of the tubular body is hinged to open outward to permit entry and exit to and from the car, the half marked $e$ being shown open in Fig. 4, the closed half being marked $e^1$, and the upper half of each of the end parts $e$, $e^1$ is glazed or is in the form of a window marked $f$, $f^1$ respectively, and one or both of the quadrant-like windows $f$, $f^1$ is pivoted at the axis of the tubular body so as to be wholly or partially turned downward into recesses or pockets provided for their reception in the lower unglazed parts of the ends $e$, $e^1$ respectively.

Figure 5:
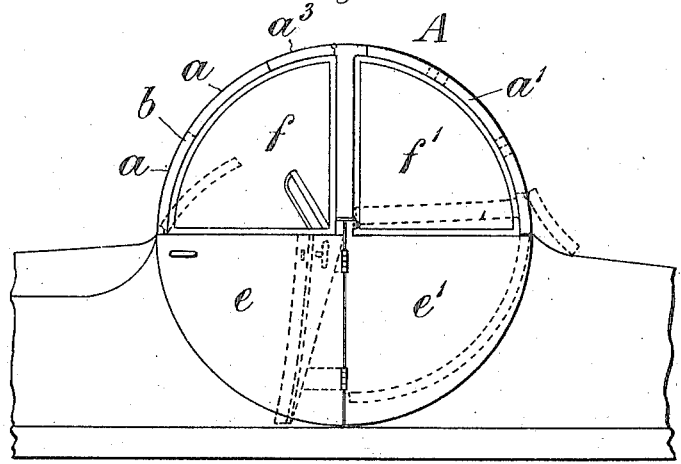
Fig. 5 represents in side elevation a motor car made in accordance with a modification of my invention hereinafter particularly described, the car being shown closed in full lines and indicated open in dotted lines.

I wish it to be understood that I do not limit myself to the precise construction of the parts hereinbefore described and illustrated in the accompanying drawings as the same may be varied without departing from the nature of my invention. For example, the front upper part $a$ of the transverse tubular body may be less than a quadrant, in which case I provide the rear quadrant-like part $a^1$ with a hinged flap or panel $a^3$ on its front edge as is represented in the modification Fig. 5; the said hinged flap or panel $a^3$, on the conversion of the vehicle from a closed car into an open car, being turned back as is indicated in dotted lines in the said Fig. 5 on to the rear part or boot of the vehicle. The upper quadrant-like end parts of the rear quadrant may be connected to the said rear part so as to turn backward and forward therewith when the vehicle is converted from a closed car into an open car and the reverse. The doors $e$ in the modified arrangement, Fig. 5, are preferably of a quadrant-like form and are hinged to the front edge of the fixed rear quadrant-like parts $e^1$ of the ends of the body as will be seen by an examination of Fig. 5, the said doors $e$ being provided with pockets to receive the upper quadrant windows $f$.

If thought necessary or desirable quadrant shaped strips may be attached to the edges of the curved rear quadrant-like parts of the upper part of the body to bring the said parts flush with the remaining parts of the upper part of the body of the vehicle.

I claim:—

1. A motor car body, having a semi-cylindrical upper part which consists of complemental front and rear arcuate members having the same radius so as to abut edge to edge against each other and made up of a set of panels, and a pair of end members associated therewith; the front arcuate member being fixed and having one of its panels pivotally mounted to swing about an axis eccentric to that of the car body into and out of closed position, and the rear arcuate member being movable bodily into and out of a recess provided for it in the lower part of the body to convert the car from closed to open type and vice versa.

2. A motor car, having a substantially cylindrical body, the axis of which crosses the car transversely, the arcuate wall of the upper part of said body being made up of front and rear sets of panels, certain of the front set being pivotally mounted to swing about an axis eccentric to that of the car body into and out of closed position.

3. A motor car, having a substantially cylindrical body, the axis of which crosses the car transversely, and a member arranged at each end of said body and made in upper and lower quadrant-shaped parts, the upper of which has the form of a framed window, at least one of said windows being pivotally mounted at the axis of the said car body to swing into and out of a pocket provided for it in the adjacent lower part.

4. A motor car, having a substantially cylindrical body, the axis of which crosses the car transversely, the upper parts of said body comprising front and rear complemental arcuate members having the same radius so as to abut edge to edge against each other, one of which members is pivotally mounted at the axis of the car body to swing into and out of a recess in the lower part of the body; and a member arranged at each end of said body and made in upper and lower quadrant-shaped parts, the upper part having the form of a framed window, at least one of said windows being movable into and out of a pocket in the adjacent lower part.

5. A motor car, having a semi-cylindrical upper part comprising front and rear arcuate members meeting edge to edge in a vertical plane crossing the car transversely; the rear-member being movable into and out of a recess provided for it in the lower part of the body and including at its forward end a hinged panel which overlaps the front half of said upper part when the rear member is in raised position but is adapted to be folded backward upon the car when said rear member is in lowered position.

In testimony whereof I have hereunto set my hand.

SYDNEY GORDON JACOBS.

Copies of this patent may be obtained for five cents each, by addressing the "Commissioner of Patents, Washington, D. C."